(12) United States Patent
Li et al.

(10) Patent No.: US 9,357,174 B2
(45) Date of Patent: May 31, 2016

(54) SYSTEM AND METHOD FOR AVATAR MANAGEMENT AND SELECTION

(75) Inventors: Wenlong Li, Beijing (CN); Xiaofeng Tong, Beijing (CN); Yangzhou Du, Beijing (CN); Wei Hu, Beijing (CN); Yimin Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 205 days.

(21) Appl. No.: 13/997,266

(22) PCT Filed: Apr. 9, 2012

(86) PCT No.: PCT/CN2012/000459
§ 371 (c)(1),
(2), (4) Date: Nov. 22, 2013

(87) PCT Pub. No.: WO2013/152454
PCT Pub. Date: Oct. 17, 2013

(65) Prior Publication Data
US 2015/0312523 A1  Oct. 29, 2015

(51) Int. Cl.
| | |
|---|---|
| *H04N 7/14* | (2006.01) |
| *H04N 7/15* | (2006.01) |
| *H04M 1/725* | (2006.01) |
| *G06F 3/0484* | (2013.01) |

(Continued)

(52) U.S. Cl.
CPC .............. *H04N 7/157* (2013.01); *G06F 3/0488* (2013.01); *G06F 3/04842* (2013.01); *G06K 9/00255* (2013.01); *H04M 1/72544* (2013.01); *H04M 2250/22* (2013.01); *H04M 2250/52* (2013.01)

(58) Field of Classification Search
CPC .............. G06F 3/04842; G06F 3/0488; G06K 9/00255; H04M 1/72544; H04M 2250/22; H04M 2250/52
USPC .................... 348/14.01–14.16; 370/259–271, 370/351–357; 709/201–207, 217–248
See application file for complete search history.

(56) References Cited

U.S. PATENT DOCUMENTS

| | | | |
|---|---|---|---|
| 5,880,731 A | * | 3/1999 | Liles .................... H04L 12/1827 345/473 |
| 5,953,700 A | | 9/1999 | Kanevsky et al. |

(Continued)

FOREIGN PATENT DOCUMENTS

| | | |
|---|---|---|
| CN | 1532775 A | 9/2004 |
| CN | 1832604 A | 9/2006 |

(Continued)

OTHER PUBLICATIONS

Office Action received for Taiwan Patent Application No. 102112378, mailed on Apr. 10, 2015, 2 pages of English Translation and 3 pages of Taiwan Office Action.

(Continued)

*Primary Examiner* — Hemant Patel
(74) *Attorney, Agent, or Firm* — Grossman, Tucker, Perreault & Pfleger, PLLC (57) ABSTRACT

A video communication system that replaces actual live images of the participating users with animated avatars. A method may include selecting an avatar, initiating communication, capturing an image, detecting a face in the image, extracting features from the face, converting the facial features to avatar parameters, and transmitting at least one of the avatar selection or avatar parameters. The system is configured to allow a user to select a new avatar during active communication with a remote user.

20 Claims, 8 Drawing Sheets

(51) Int. Cl.
*G06F 3/0488* (2013.01)
*G06K 9/00* (2006.01)

(56) References Cited

U.S. PATENT DOCUMENTS

| | | | |
|---|---|---|---|
| 6,072,496 A | 6/2000 | Guenter et al. | |
| 6,313,864 B1 | 11/2001 | Tabata et al. | |
| 7,003,501 B2 | 2/2006 | Ostroff | |
| 7,176,956 B2* | 2/2007 | Rzeszewski | H04N 7/147 348/14.01 |
| 7,237,717 B1 | 7/2007 | Rao et al. | |
| 7,716,133 B1 | 5/2010 | Foote et al. | |
| 7,752,270 B2* | 7/2010 | Durand | H04L 51/046 709/204 |
| 8,111,281 B2* | 2/2012 | Sangberg | H04N 7/147 348/14.01 |
| 8,260,262 B2 | 9/2012 | Ben Ayed | |
| 2002/0029258 A1 | 3/2002 | Mousseau et al. | |
| 2003/0206171 A1 | 11/2003 | Kim et al. | |
| 2003/0225846 A1* | 12/2003 | Heikes | G06Q 10/107 709/207 |
| 2007/0019885 A1 | 1/2007 | Chatting et al. | |
| 2008/0059570 A1* | 3/2008 | Bill | G06Q 10/10 709/203 |
| 2008/0136814 A1 | 6/2008 | Chu et al. | |
| 2008/0170777 A1 | 7/2008 | Sullivan et al. | |
| 2008/0214168 A1* | 9/2008 | Bailey | H04M 1/72555 455/415 |
| 2009/0002479 A1 | 1/2009 | Sangberg et al. | |
| 2009/0158160 A1 | 6/2009 | Alberth, Jr. et al. | |
| 2009/0315893 A1 | 12/2009 | Smith et al. | |
| 2011/0162082 A1 | 6/2011 | Paksoy et al. | |
| 2012/0115584 A1 | 5/2012 | Nguyen et al. | |
| 2013/0019154 A1 | 1/2013 | Wolfston et al. | |
| 2013/0096916 A1 | 4/2013 | Pemmaraju | |
| 2013/0132091 A1 | 5/2013 | Skerpac | |
| 2013/0217364 A1 | 8/2013 | Varoglu et al. | |
| 2013/0219166 A1 | 8/2013 | Ristov et al. | |
| 2013/0232578 A1 | 9/2013 | Chevallier-Mames et al. | |
| 2014/0035934 A1 | 2/2014 | Du et al. | |
| 2014/0055554 A1 | 2/2014 | Du et al. | |
| 2014/0093083 A1 | 4/2014 | Dadu et al. | |
| 2014/0152758 A1 | 6/2014 | Tong et al. | |
| 2014/0218459 A1 | 8/2014 | Wenlong et al. | |

FOREIGN PATENT DOCUMENTS

| | | |
|---|---|---|
| CN | 1920886 A | 2/2007 |
| CN | 1972274 | 5/2007 |
| CN | 101035242 A | 9/2007 |
| CN | 101472158 | 7/2009 |
| CN | 101677389 A | 3/2010 |
| CN | 101690071 A | 3/2010 |
| CN | 101826217 A | 9/2010 |
| CN | 101924924 A | 12/2010 |
| CN | 102087750 | 6/2011 |
| CN | 102214288 A1 | 10/2011 |
| CN | 102271241 A | 12/2011 |
| KR | 10-2005-0031020 A | 4/2005 |
| TW | M290286 U | 5/2006 |
| WO | 2009/128784 A1 | 10/2009 |
| WO | 2012/139276 A1 | 10/2012 |
| WO | 2013097139 | 7/2013 |
| WO | 2013097264 | 7/2013 |
| WO | 2013/152454 A1 | 10/2013 |
| WO | 2013152453 | 10/2013 |
| WO | 2013152455 | 10/2013 |
| WO | 2013/152454 A8 | 11/2014 |

OTHER PUBLICATIONS

"Digital rights management," Wikipedia, The Free Encyclopedia, retrieved from: <http://en.wikipedia.org/w/index.php?title=Digital_rights_management&oldid=481966770>, edited Mar. 15, 2012, 11 pages.

"GazeLib," downloaded from code.google.com/p/gazelib, 1 Page, Aug. 23, 2013.

"Introducing Tobii Technology," downloaded from www.tobii.com, 2 Pages, Aug. 23, 2013.

"ITU Gaza Tracker," downloaded from www.gazegroup.org/downloads/23-gazetracker, 4 Pages, Aug. 23, 2013.

"Multi-factor authentication," Wikipedia, The Free Encyclopedia, retrieved from: <http://en.wikipedia.org/w/index.php?title=Multi-factor_authentication&oldid=476406166>, edited Feb. 12, 2012, 3 pages.

"Opengazer: open-source gaze tracker for ordinary webcams," downloaded from www.inference.phy.cam.ac.uk/opengazer, 7 Pages, Aug. 23, 2013.

"Speaker recognition," Wikipedia, The Free Encyclopedia, retrieved from: <http://en.wikipedia.org/w/index.php?title=Speaker_recognition&oldid=478159860>, edited Feb. 21, 2012, 3 pages.

"Speech recognition," Wikipedia, The Free Encyclopedia, retrieved from: <http://en.wikipedia.org/w/index.php?title=Speech_recognition&oldid=482422120>, edited Mar. 17, 2012, 12 pages.

3D Face Modeller: 3D Face Generator, downloaded from www.facegen.com/modeller, 8 pages, Jan. 10, 2012.

3D PhotoFace, downloaded from www.oddcast.com/technologies/photoface, 1 page, Jan. 10, 2012.

Evaluation of Face Recognition Algorithms, http://www.cs.colostate.edu/evalfacerec/index10.php, Colorado State University, Fort Collins, CO, 2010. Retrieved Dec. 22, 2011, 1 Page.

International Search Report and Written Opinion received for PCT Application No. PCT/CN2012/000461, mailed on Oct. 4, 2012, 11 Pages.

International Search Report and Written Opinion received for PCT Application No. PCT/CN2011/084902, mailed on Oct. 18, 2012, 10 Pages.

International Search Report and Written Opinion received for PCT Application No. PCT/CN2012/000458, mailed on Jan. 24, 2013, 14 Pages.

International Search Report and Written Opinion received for PCT Application No. PCT/CN2012/000460, mailed on Dec. 20, 2012, 12 Pages.

Office Action received for Taiwan Patent Application No. 102112378, mailed on Nov. 13, 2014, 11 pages of English Translation and 20 pages of Taiwan Office Action.

Beveridge, J. Ross, et al., "The CSU Face Identification Evaluation System; Its purpose, features and structure," Colorado State University, published online, Aug. 20, 2004, Machine Vision and Applications (2005) 16:128-138, 11 pages.

Li et al., "Method and System of Driving Game Avatar/Character Using Facial Expression and Head Movement," 12 Pages, Oct. 29, 2011.

Li et al., "One Instant Messenger With Live Avatar Animation by User's Head Motion and Facial Expression," 12 Pages, Oct. 17, 2011.

International Search Report and Written Opinion Received for PCT Patent Application No. PCT/CN2011/072603, mailed on Oct. 27, 2011, 14 pages.

International Preliminary Report on Patentability and Written Opinion received for PCT Patent Application No. PCT/CN2012/000460, mailed on Oct. 23, 2014, 7 pages.

International Preliminary Report on Patentability and Written Opinion received for PCT Patent Application No. PCT/CN2012/000461, mailed on Jul. 10, 2014, 7 pages.

Viola, Paul, et al., "Rapid Object Detection using a Boosted Cascade of Simple Features," Accepted Conference on Computer Vision and Pattern Recognition 2001, 9 pages, 2001.

International Search Report and Written Opinion received for PCT Application No. PCT/CN2012/000459, mailed on Jan. 17, 2013, 11 Pages.

Office Action received for Chinese Patent Application No. 201280071891.9, mailed on Jun. 4, 2015, 19 pages of English Translation.

Visual Avatar Chat—Free Chat Server, downloaded from http://visualchat.weirdoz.org, Nov. 22, 2013, 2 pages.

* cited by examiner

SYSTEM AND METHOD FOR AVATAR MANAGEMENT AND SELECTION

FIELD

The present disclosure relates to video communication and interaction, and, more particularly, to an apparatus and method for managing and selecting avatars for use in video communication and/or interaction.

BACKGROUND

The increasing variety of functionality available in mobile devices has spawned a desire for users to communicate via video in addition to simple calls. For example, users may initiate "video calls," "videoconferencing," etc., wherein a camera and microphone in a device captures audio and real-time video of a user for transmitting to one or more other recipients such as other mobile devices, desktop computers, videoconferencing systems, etc. The communication of real-time video may involve the transmission of substantial amounts of data (e.g., depending on the technology of the camera, the particular video codec employed to process the real time image information, etc.). Given the bandwidth limitations of existing 2G/3G wireless technology, and the still limited availability of emerging 4G wireless technology, the proposition of many device users conducting concurrent video calls places a large burden on bandwidth in the existing wireless communication infrastructure, which may impact negatively on the quality of the video call.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

By way of overview, the present disclosure is generally directed to a system and method for video communication and interaction using avatars. More specifically, a system and method consistent with the present disclosure generally provides management and selection of avatar models for use during video communication and interaction. Using avatars, as opposed to live images, substantially reduces the amount of data to be transmitted, and thus, the avatar communication requires less bandwidth.

In one embodiment an application is activated in a device coupled to a camera. The application may be configured to allow a user to select an avatar for display on a remote device, in a virtual space, etc. The device may then be configured to initiate communication with at least one other device, a virtual space, etc. For example, the communication may be established over a 2G, 3G, 4G cellular connection. Alternatively, the communication may be established over the Internet via a WiFi connection. After the communication is established, the camera may be configured to start capturing images. Facial detection/tracking is then performed on the captured images, and feature extraction is performed on the face. The detected face/head movements and/or changes in facial features are then converted into parameters usable for animating the avatar on the at least one other device, within the virtual space, etc. At least one of the avatar selection and avatar parameters are then transmitted. In one embodiment at least one of a remote avatar selection or remote avatar parameters are received. The remote avatar selection may cause the device to display an avatar, while the remote avatar parameters may cause the device to animate the displayed avatar. Audio communication accompanies the avatar animation via known methods.

During active communication, the user of device may change the currently displayed avatar and select a different avatar to be displayed. The user may access an interface configured to allow the user to browse among avatars to select from during active communication with the remote device. The avatar selection is then transmitted to the remote device, upon which the remote device compares the avatar selection and associated parameters with avatar files on the remote device to determine whether a matching avatar exists on the remote device. If it is determined that the remote device includes an avatar that matches the avatar selection, the selected avatar is displayed on the remote device. If it is determined that the remote device does not include a matching avatar, then a failure message is presented to the user indicating that the selected avatar cannot be accessed and/or processed the user may continue to browse and select a different avatar to use.

Figure 1A:
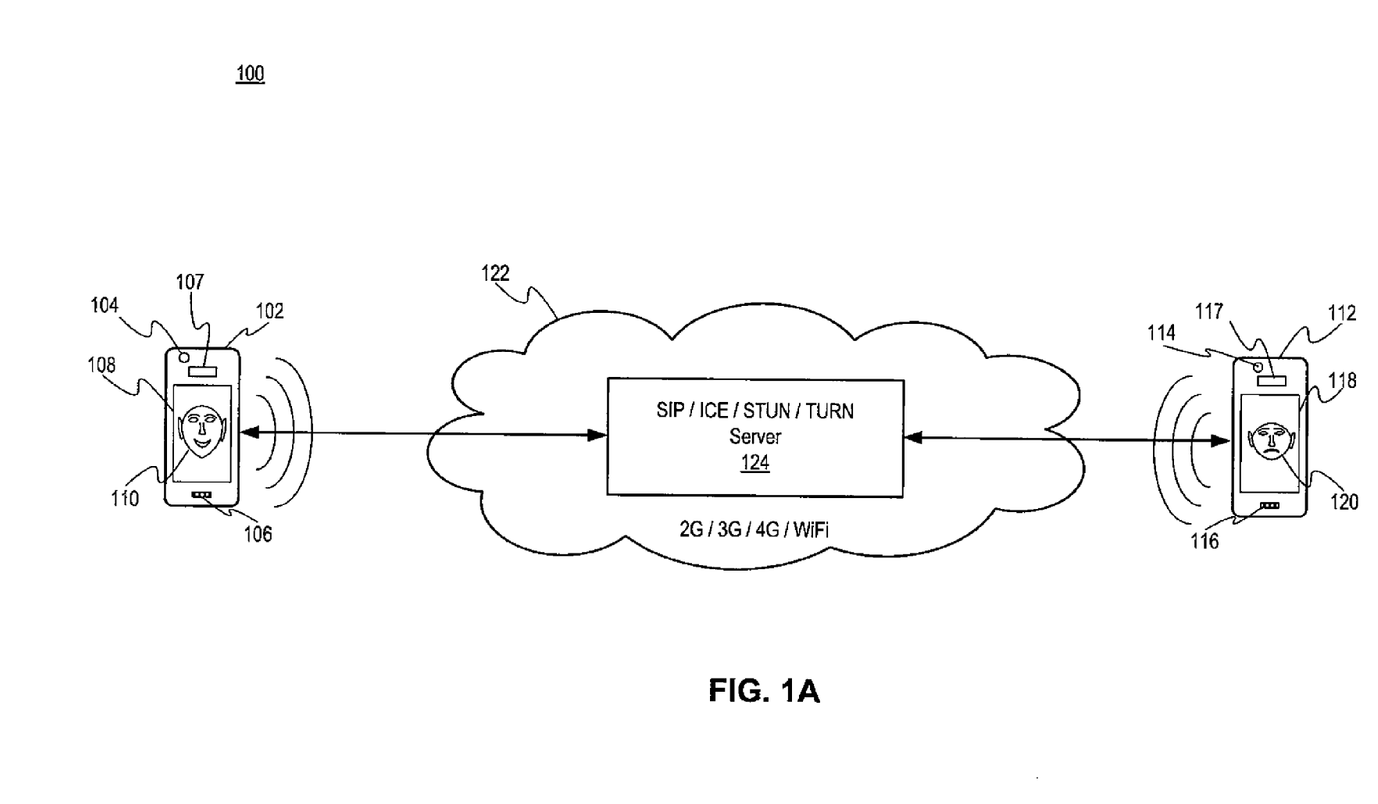
FIG. 1A illustrates an example device-to-device system consistent with various embodiments of the present disclosure.

FIG. 1A illustrates device-to-device system 100 consistent with various embodiments of the present disclosure. The system 100 may generally include devices 102 and 112 communicating via network 122. Device 102 includes at least camera 104, microphone 106 and display 108. Device 112 includes at least camera 114, microphone 116 and display 118. Network 122 includes at least one server 124.

Devices 102 and 112 may include various hardware platforms that are capable of wired and/or wireless communication. For example, devices 102 and 112 may include, but are not limited to, videoconferencing systems, desktop computers, laptop computers, tablet computers, smart phones, (e.g., iPhones®, Android®-based phones, Blackberries®, Symbian®-based phones, Palm®-based phones, etc.), cellular handsets, etc.

Cameras 104 and 114 include any device for capturing digital images representative of an environment that includes one or more persons, and may have adequate resolution for face analysis of the one or more persons in the environment as described herein. For example, cameras 104 and 114 may include still cameras (e.g., cameras configured to capture still photographs) or video cameras (e.g., cameras configured to capture moving images comprised of a plurality of frames). Cameras 104 and 114 may be configured to operate using light in the visible spectrum or with other portions of the electromagnetic spectrum not limited to the infrared spectrum, ultraviolet spectrum, etc. Cameras 104 and 114 may be incorporated within devices 102 and 112, respectively, or may be separate devices configured to communicate with devices 102 and 112 via wired or wireless communication. Specific examples of cameras 104 and 114 may include wired (e.g., Universal Serial Bus (USB), Ethernet, Firewire, etc.) or wireless (e.g., WiFi, Bluetooth, etc.) web cameras as may be associated with computers, video monitors, etc., mobile device cameras (e.g., cell phone or smart phone cameras integrated in, for example, the previously discussed example devices), integrated laptop computer cameras, integrated tablet computer cameras (e.g., iPad®, Galaxy Tab®, and the like), etc.

Devices 102 and 112 may further include microphones 106 and 116. Microphones 106 and 116 include any devices configured to sense sound. Microphones 106 and 116 may be integrated within devices 102 and 112, respectively, or may interact with the devices 102, 112 via wired or wireless communication such as described in the above examples regarding cameras 104 and 114. Displays 108 and 118 include any devices configured to display text, still images, moving images (e.g., video), user interfaces, graphics, etc. Displays 108 and 118 may be integrated within devices 102 and 112, respectively, or may interact with the devices via wired or wireless communication such as described in the above examples regarding cameras 104 and 114.

In one embodiment, displays 108 and 118 are configured to display avatars 110 and 120, respectively. As referenced herein, an Avatar is defined as graphical representation of a user in either two-dimensions (2D) or three-dimensions (3D). Avatars do not have to resemble the looks of the user, and thus, while avatars can be lifelike representations they can also take the form of drawings, cartoons, sketches, etc. As shown, device 102 may display avatar 110 representing the user of device 112 (e.g., a remote user), and likewise, device 112 may display avatar 120 representing the user of device 102. As such, users may view a representation of other users without having to exchange large amounts of information that are generally involved with device-to-device communication employing live images.

Network 122 may include various second generation (2G), third generation (3G), fourth generation (4G) cellular-based data communication technologies, Wi-Fi wireless data communication technology, etc. Network 122 includes at least one server 124 configured to establish and maintain communication connections when using these technologies. For example, server 124 may be configured to support Internet-related communication protocols like Session Initiation Protocol (SIP) for creating, modifying and terminating two-party (unicast) and multi-party (multicast) sessions, Interactive Connectivity Establishment Protocol (ICE) for presenting a framework that allows protocols to be built on top of bytestream connections, Session Traversal Utilities for Network Access Translators, or NAT, Protocol (STUN) for allowing applications operating through a NAT to discover the presence of other NATs, IP addresses and ports allocated for an application's User Datagram Protocol (UDP) connection to connect to remote hosts, Traversal Using Relays around NAT (TURN) for allowing elements behind a NAT or firewall to receive data over Transmission Control Protocol (TCP) or UDP connections, etc.

Figure 1B:
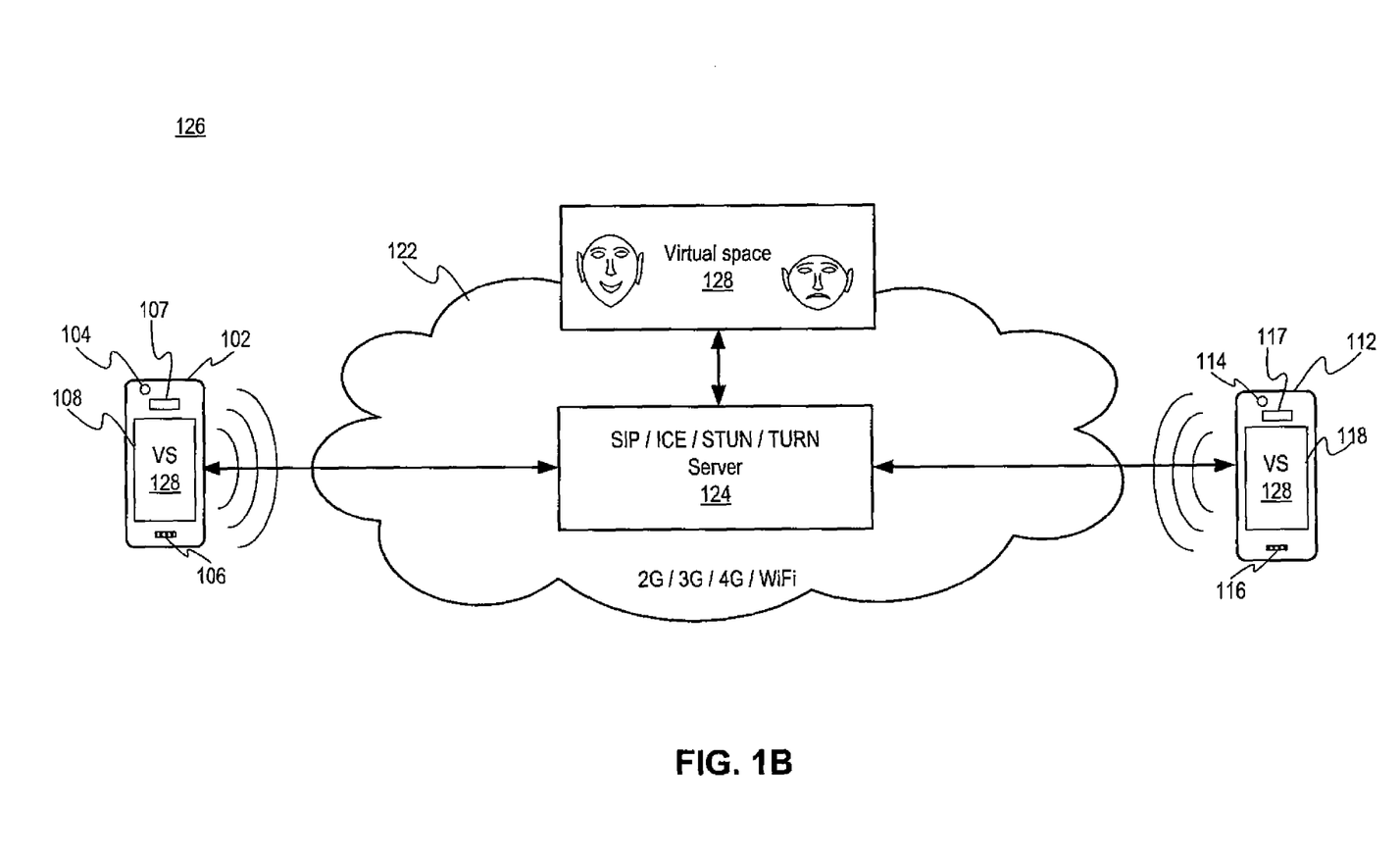
FIG. 1B illustrates an example virtual space system consistent with various embodiments of the present disclosure.

FIG. 1B illustrates a virtual space system 126 consistent with various embodiments of the present disclosure. The system 126 may include device 102, device 112 and server 124. Device 102, device 112 and server 124 may continue to communicate in the manner similar to that illustrated in FIG. 1A, but user interaction may take place in virtual space 128 instead of in a device-to-device format. As referenced herein, a virtual space may be defined as a digital simulation of a physical location. For example, virtual space 128 may resemble an outdoor location like a city, road, sidewalk, field, forest, island, etc., or an inside location like an office, house, school, mall, store, etc.

Users, represented by avatars, may appear to interact in virtual space 128 as in the real world. Virtual space 128 may exist on one or more servers coupled to the Internet, and may be maintained by a third party. Examples of virtual spaces include virtual offices, virtual meeting rooms, virtual worlds like Second Life®, massively multiplayer online role-playing games (MMORPGs) like World of Warcraft®, massively multiplayer online real-life games (MMORLGs), like The Sims Online®, etc. In system 126, virtual space 128 may contain a plurality of avatars corresponding to different users. Instead of displaying avatars, displays 108 and 118 may display encapsulated (e.g., smaller) versions of virtual space (VS) 128. For example, display 108 may display a perspective view of what the avatar corresponding to the user of device 102 "sees" in virtual space 128. Similarly, display 118 may display a perspective view of what the avatar corresponding to the user of device 112 "sees" in virtual space 128. Examples of what avatars might see in virtual space 128 may include, but are not limited to, virtual structures (e.g., buildings), virtual vehicles, virtual objects, virtual animals, other avatars, etc.

Figure 2:
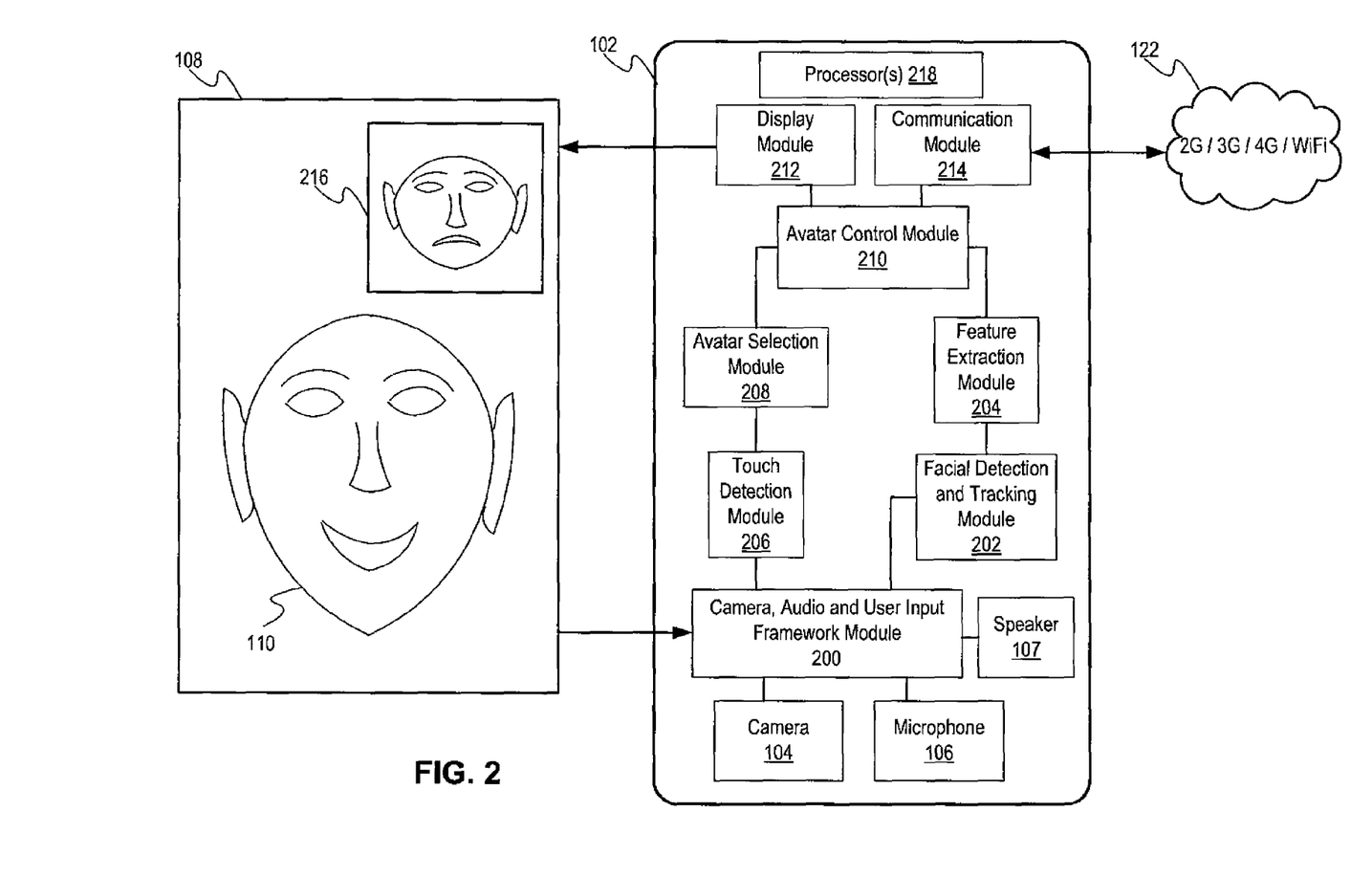
FIG. 2 illustrates an example device in consistent with various embodiments of the present disclosure.

FIG. 2 illustrates an example device 102 in accordance with various embodiments of the present disclosure. While only device 102 is described, device 112 (e.g., remote device) may include resources configured to provide the same or similar functions. As previously discussed, device 102 is shown including camera 104, microphone 106 and display 108. As generally understood, device 102 may further include multiple forms of user input (e.g. buttons, knobs, trackball, touch-screen, etc.) configured to allow a user to input spatial data to control operations of the device 102 (i.e. navigate a graphical user interface (GUI) running on the device 102). In one embodiment, the display 108 may be a touch-sensitive display configured to allow a user to control (i.e. navigate) a GUI of the device 102 presented on the display 108, described in greater detail herein.

The camera 104, microphone 106 and touch-sensitive display 108 may provide input to a camera, audio and user input framework module 200. The camera, audio and user input framework module 200 may include custom, proprietary, known and/or after-developed audio, video processing, and/or user input code (or instruction sets) that are generally well-defined and operable to control at least camera 104, microphone 106 and touch-sensitive display 108. For example, the camera, audio and user input framework module 200 may cause camera 104, microphone 106 and touch-sensitive display 108 to record images, distances to objects, sounds and/or touches, may process images, sounds, audio signal(s) and/or touches, may cause images and/or sounds to be reproduced, etc. The camera, audio and user input framework module 200 may vary depending on device 102, and more particularly, the operating system (OS) running in device 102. Example operating systems include iOS®, Android®, Blackberry® OS, Symbian®, Palm® OS, etc. The speaker 107 may receive audio information from camera, audio and user input framework module 200 and may be configured to reproduce local sounds (e.g., to provide audio feedback of the user's voice, transformed or not) and remote sounds (e.g., the sound(s) of the other part(ies) (transformed or not) engaged in a telephone, video call or interaction in a virtual place).

The device 102 may further include a facial detection and tracking module 202 configured to identify and track a head, face and/or facial region within image(s) provided by camera 104. For example, the facial detection module 202 may include custom, proprietary, known and/or after-developed face detection code (or instruction sets), hardware, and/or firmware that are generally well-defined and operable to receive a standard format image (e.g., but not limited to, a RGB color image) and identify, at least to a certain extent, a face in the image. The facial detection and tracking module 202 may also be configured to track the detected face through a series of images (e.g., video frames at 24 frames per second) and to determine a head position based on the detected face. Known tracking systems that may be employed by facial detection/tracking module 104 may include particle filtering, mean shift, Kalman filtering, etc., each of which may utilize edge analysis, sum-of-square-difference analysis, feature point analysis, histogram analysis, skin tone analysis, etc.

The device 102 may further include feature extraction module 204 configured to recognize features (e.g., the location and/or shape of facial landmarks such as eyes, eyebrows, nose, mouth, etc.) in the face detected by face detection module 202. In one embodiment, avatar animation may be based directly on sensed facial actions (e.g., changes in facial features) without facial expression recognition. The corresponding feature points on an avatar's face may follow or mimic the movements of the real person's face, which is known as "expression clone" or "performance-driven facial animation." The feature extraction module 204 may include custom, proprietary, known and/or after-developed facial characteristics recognition code (or instruction sets) that are generally well-defined and operable to receive a standard format image (e.g., but not limited to a RGB color image) from camera 104 and to extract, at least to a certain extent, one or more facial characteristics in the image. Such known facial characteristics systems include, but are not limited to, the CSU Face Identification Evaluation System by Colorado State University.

The feature extraction module 204 may also be configured to recognize an expression associated with the detected features (e.g., identifying whether a previously detected face happy, sad, smiling, frown, surprised, excited, etc.)). Thus, feature extraction module 204 may further include custom, proprietary, known and/or after-developed facial expression detection and/or identification code (or instruction sets) that is generally well-defined and operable to detect and/or identify expressions in a face. For example, feature extraction module 204 may determine size and/or position of the facial features (e.g., eyes, mouth, cheeks, teeth, etc.) and may compare these facial features to a facial feature database which includes a plurality of sample facial features with corresponding facial feature classifications (e.g., smiling, frown, excited, sad, etc.).

The device 102 further includes a touch detection module 206 configured to receive touch data from the camera, audio and user input framework module 200 and to identify the touch event based on the received touch data and generate touch input data. The touch event identifier may include touch type and/or touch location(s) of the touch-sensitive display 108. Touch type may include a single tap, a double tap, a tap and hold, a tap and move, a pinch and stretch, a swipe, etc., to the touch-sensitive display 108. Touch location(s) may include a touch start location, a touch end location and/or intermediate moving touch locations, etc., of the touch-sensitive display 108. The touch locations may correspond to coordinates of touch-sensitive display 108. The touch detection module 208 may include custom, proprietary, known and/or after-developed touch detection code (or instruction sets) that are generally well-defined and operable to receive touch data and to identify a touch event.

Figure 3:
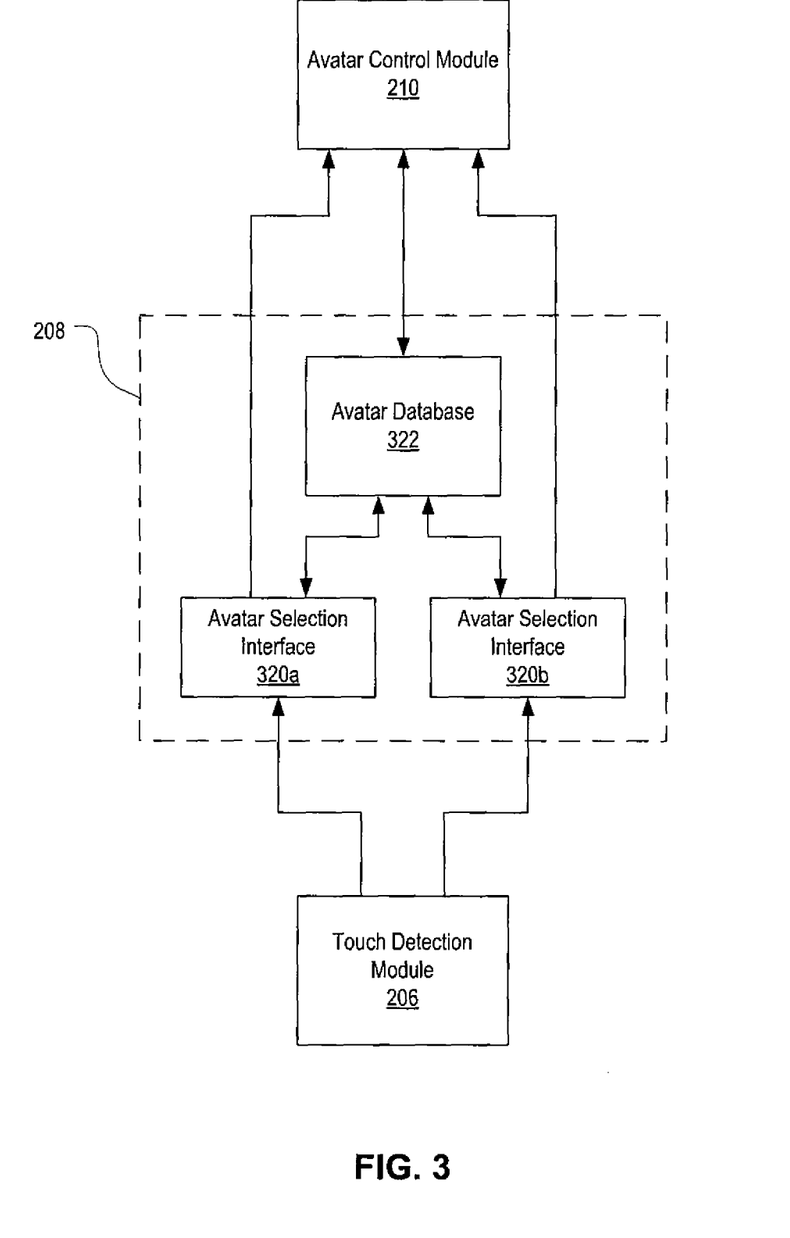
FIG. 3 illustrates the device of FIG. 2 in greater detail.

The device 102 further includes an avatar selection module 208 configured to allow a user of device 102 to select an avatar for display on a remote device. More specifically, as shown in FIG. 3 and described in greater detail herein, the avatar selection module 208 may provide an interface configured to allow a user to access and browse one or more avatar files stored in an avatar database and to select one of the avatars to display on a remote device during video communication and interaction. The avatar selection module 208 is configured to receive touch input data from the touch detection module 206 to allow the user to navigate and/or manipulate the interface for browsing and selecting an avatar, as will be described in greater detail herein.

The avatar selection module 208 may include custom, proprietary, known and/or after-developed user interface construction code (or instruction sets) that are generally well-defined and operable to present different avatars to a user so that the user may select one of the avatars. In one embodiment, one or more avatars may be predefined in an avatar database in the device 102. Predefined avatars allow all devices to have the same avatars, and during interaction only the selection of an avatar (e.g., the identification of a predefined avatar) needs to be communicated to a remote device or virtual space, which reduces the amount of information that needs to be exchanged. Avatars may be selected prior to establishing communication. The selection of avatars may also occur during the course of an active communication. Thus, it may be possible to send or receive an avatar selection at any point during the communication, and for the receiving device to change the displayed avatar in accordance with the received avatar selection, described in greater detail herein.

The device 102 may further include an avatar control module 210 configured to receive user input, such as, for example, a selected avatar from the avatar selection module 208 based on the touch input data of the touch detection module 206 and to further transmit such information for transmission and receipt by a remote device.

The avatar control module 210 may be configured to generate parameters for animating an avatar. Animation, as referred to herein, may be defined as altering the appearance of an image/model. A single animation may alter the appearance of a 2-D still image, or multiple animations may occur in sequence to simulate motion in the image (e.g., head turn, nodding, blinking, talking, frowning, smiling, laughing, winking, blinking, etc.) An example of animation for 3-D models includes deforming a 3-D wireframe model, applying a texture mapping, and re-computing the model vertex normal for rendering. A change in position of the detected face and/or extracted facial features may be may converted into parameters that cause the avatar's features to resemble the features of the user's face.

In one embodiment the general expression of the detected face may be converted into one or more parameters that cause the avatar to exhibit the same expression. The expression of the avatar may also be exaggerated to emphasize the expression. Knowledge of the selected avatar may not be necessary when avatar parameters may be applied generally to all of the predefined avatars. However, in one embodiment avatar parameters may be specific to the selected avatar, and thus, may be altered if another avatar is selected. For example, human avatars may require different parameter settings (e.g., different avatar features may be altered) to demonstrate emotions like happy, sad, angry, surprised, etc. than animal avatars, cartoon avatars, etc.

The avatar control module 210 may include custom, proprietary, known and/or after-developed graphics processing code (or instruction sets) that are generally well-defined and operable to generate parameters for animating the avatar selected by the avatar selection module 208 based on the face/head position detected by face detection and tracking module 202 and/or the facial features detected by feature extraction module 204. For facial feature-based animation methods, 2-D avatar animation may be done with, for example, image warping or image morphing, whereas 3-D avatar animation may be done with free form deformation (FFD) or by utilizing the animation structure defined in a 3-D model of a head, Oddcast is an example of a software resource usable for 2-D avatar animation, while FaceGen is an example of a software resource usable for 3-D avatar animation.

The avatar control module 210 may further receive a remote avatar selection and remote avatar parameters usable for displaying and animating an avatar corresponding to a user at a remote device. The avatar control module 210 may cause a display module 212 to display avatar 110 on display 108. The display module 212 may include custom, proprietary, known and/or after-developed graphics processing code (or instruction sets) that are generally well-defined and operable to display and animate an avatar on display 108 in accordance with the example device-to-device embodiment. For example, the avatar control module 210 may receive a remote avatar selection and may interpret the remote avatar selection to correspond to a predetermined avatar. The display module 212 may then display avatar 110 on display 108. Moreover, remote avatar parameters received in avatar control module 210 may be interpreted, and commands may be provided to the display module 212 to animate avatar 110.

In one embodiment more than two users may engage in the video call. When more than two users are interacting in a video call, display 108 may be divided or segmented to allow more than one avatar corresponding to remote users to be displayed simultaneously. Alternatively, in system 126, the avatar control module 210 may receive information causing display module 212 to display what the avatar corresponding to the user of device 102 is "seeing" in virtual space 128 (e.g., from the visual perspective of the avatar). For example, display 108 may display buildings, objects, animals represented in virtual space 128, other avatars, etc. In one embodiment, the avatar control module 210 may be configured to cause display module 212 to display "feedback" avatar 216. The feedback avatar 216 represents how the selected avatar appears on the remote device, in a virtual place, etc. In particular, feedback avatar 216 appears as the avatar selected by the user and may be animated using the same parameters generated by the avatar control module 210. In this way, the user may confirm what the remote user is seeing during their interaction.

The device 102 further includes a communication module 214 configured to transmit and receive information for selecting avatars, displaying avatars, animating avatars, displaying virtual place perspective, etc. The communication module 214 may include custom, proprietary, known and/or after-developed communication processing code (or instruction sets) that are generally well-defined and operable to transmit avatar selections, avatar parameters and receive remote avatar selections and remote avatar parameters. The communication module 214 may also transmit and receive audio information corresponding to avatar-based interactions. The communication module 214 transmits and receives the above information via network 122 as previously described.

The device 102 may further include one or more processor(s) 218 configured to perform operations associated with device 102 and one or more of the modules included therein.

FIG. 3 illustrates the device 102 of FIG. 2 in greater detail. As previously described, the avatar selection module 208 is configured to allow a user of device 102 to select an avatar for display on a remote device. As shown, the avatar selection module 208 may provide a first avatar selection interface 320a and a second avatar selection interface 320b. The first and second avatar selection interfaces 320a, 320b may each be configured to allow a user to access an avatar database 322 and browse avatar files stored in the avatar database 322. The first and second interfaces 320a, 320b may further be configured to allow a user to select an avatar file from the database 322. An avatar file may include an avatar model and corresponding data, including, but not limited to, the name or ID of the avatar model, the type of avatar model (e.g. 3D or 2D), the size of the avatar file, etc.

In one embodiment, one or more avatars may be predefined in the avatar database 322. Predefined avatars may allow all devices to have the same avatars, and during interaction, only the selection of an avatar (e.g., the identification of a predefined avatar) needs to be communicated to a remote device or virtual space, which reduces the amount of information that needs to be exchanged. The avatar database 322 may also include custom avatars created by the user using any custom, proprietary, known and/or after-developed methods for avatar generation.

Avatars may be selected prior to establishing communication and/or during the course of an active communication. Thus, it may be possible to send or receive an avatar selection at any point during the communication, and for the receiving device to change the displayed avatar in accordance with the received avatar selection. The first and second avatar selection interfaces 320a, 320b provide a user with different methods of browsing and selecting avatars from the avatar database 322, described in greater detail herein. Upon the selection of an avatar, the avatar selection module 208 is configured to transmit identifying data (e.g., avatar ID) corresponding to the selected avatar file to the avatar control module 210, which, in turn, will further transmit the corresponding avatar data to the communication module 214 to be transmitted to the remote device, such that the selected avatar may be displayed on the remote device.

Upon receiving the identifying avatar data from device 102, an avatar control module of the remote device may be configured to determine whether the selected avatar is included on the remote device and can be displayed. More specifically, the avatar control module of the remote device is configured to compare the identifying data of the avatar for use by the local user with identifying data of associated avatar files of an avatar database of the remote device. The avatar control module of the remote device may further be configured to identify an avatar having identifying data that matches the identifying data of the avatar selected by the local user.

Upon identifying an avatar file in the avatar database of the remote device that matches the selected avatar file, the avatar control module of the remote device may be configured to transmit a response signal to the avatar control module 210 indicating that the remote device includes a matching avatar file. Upon the establishment that that remote device includes a matching avatar file and upon receipt of the response signal indicating a match, the selected avatar is displayed on the remote device and the avatar control module 210 may be configured to cause display module 212 to display the selected avatar. More specifically, the selected avatar is displayed as the "feedback" avatar 216. The feedback avatar 216 appears as the avatar selected by the user, wherein the user may confirm what the remote user is seeing during their interaction.

In the event that the avatar database of the remote device does not include a matching avatar file, a response signal is transmitted to the avatar control module 210 indicating that the remote device does not include a matching avatar file. Upon receiving the response signal, the avatar control module 210 may be configured to cause the display module 212 to display a warning message on the display 108 indicating that the selected avatar cannot be accessed and/or processed and may further indicate that the remote device does not include the selected avatar file.

Similarly, the avatar control module 210 of device 102 may be configured to receive a remote avatar selection from a user at a remote device, wherein the avatar control module 210 may be configured to determine whether the selected avatar file from the remote user is included on the device 102. More specifically, the avatar control module 210 to establish a matching avatar file on the device 102 by comparing the selected avatar file from the remote user with avatar files in the avatar database 322. Upon establishing a matching avatar file in the avatar database 322, the avatar control module 210 is configured cause the display module to display the selected avatar of the remote user on the display 108. The avatar control module 210 is further configured to transmit a response signal to the remote device indicating a matching avatar file. In the event that avatar control module 210 fails to establish a matching avatar file, the avatar control module 210 is configured to transmit a response signal to the remote device indicating that the device 102 does not include a matching avatar file.

Figure 4A:
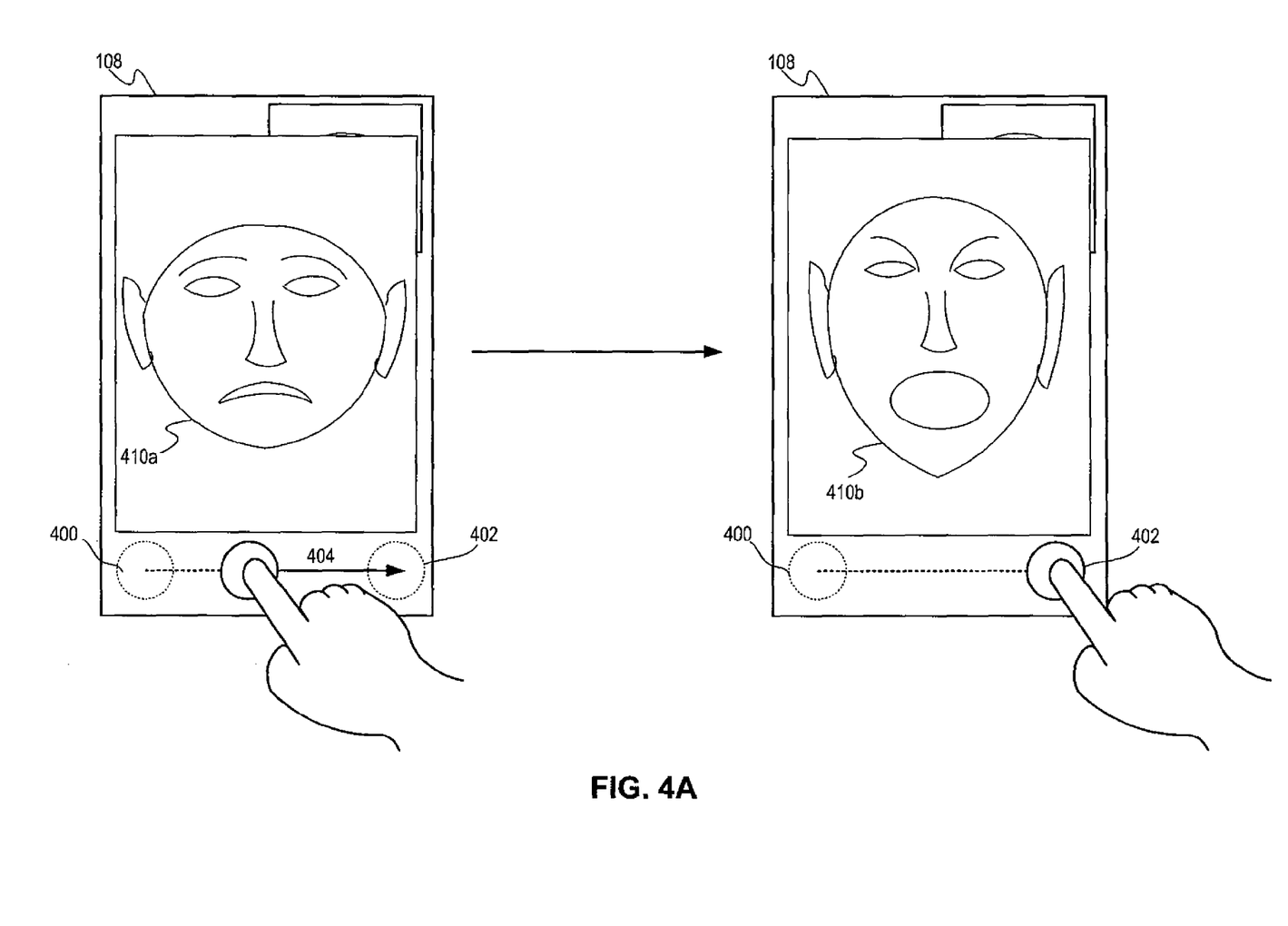
FIGS. 4A and 4B illustrate exemplary methods of selecting an avatar consistent with various embodiments of the present disclosure.
Figure 4B:
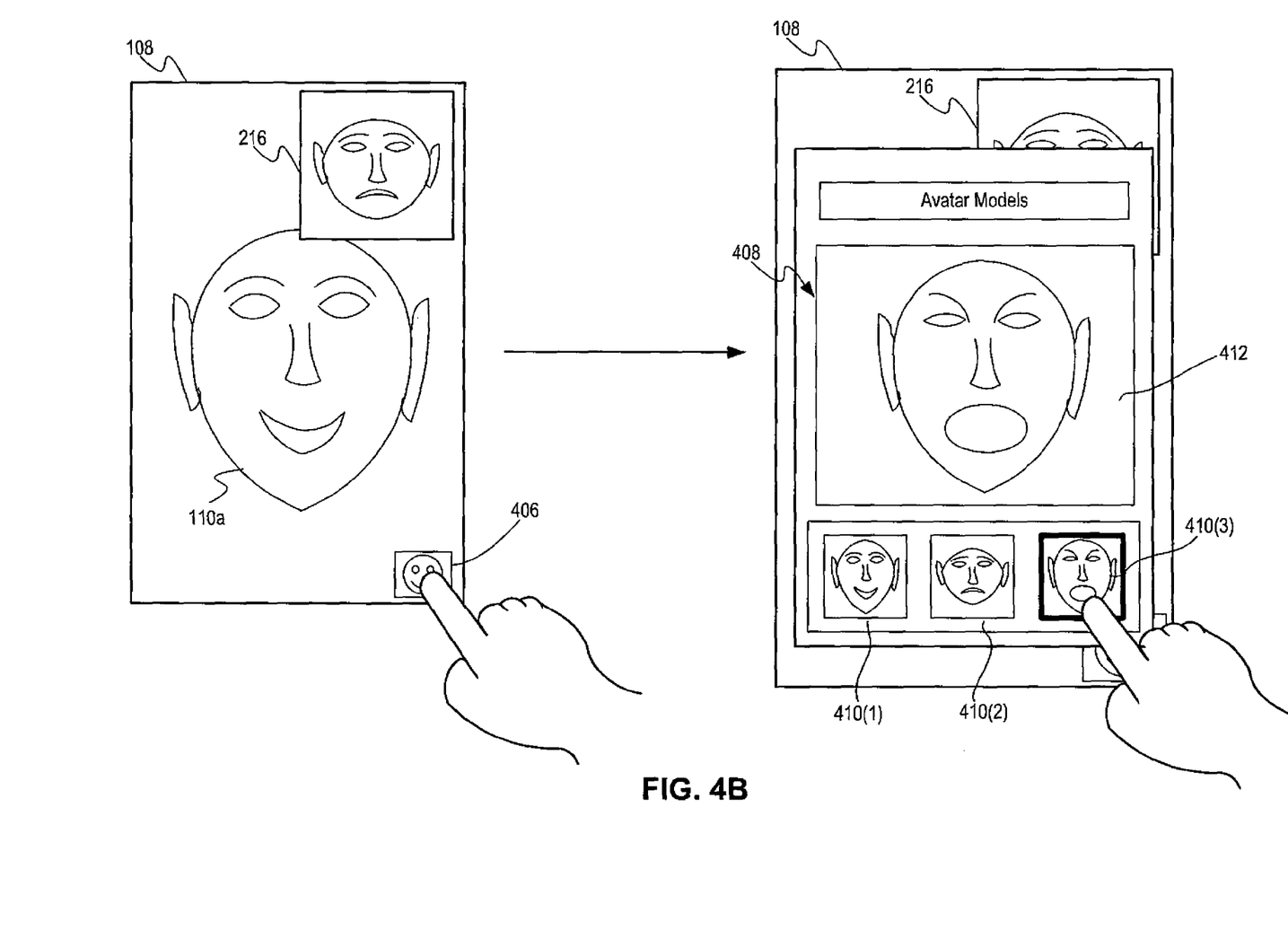

FIGS. 4A and 4B illustrate exemplary methods of selecting an avatar model consistent with various embodiments of the present disclosure. As previously described, the avatar selection module 206 includes first and second avatar selection interfaces 320a, 320b configured to allow a user to access the avatar database 322 and browse avatar files stored in the avatar database 322. The first and second interfaces 320a, 320b may further be configured to allow a user to select an avatar file from the database 322 to be displayed during the course of an active video communication and interaction with a remote user.

FIG. 4A illustrates an exemplary embodiment of the first avatar selection interface 320a. In the illustrated embodiment, the first avatar selection interface 320a may be configured to allow a user to browse avatar files by way of a swiping gesture on the touch-sensitive display 108. As shown, upon accessing the first avatar selection interface 320a, the user may be presented with an avatar model (shown as 410a) from an associated avatar file available in the avatar database 322. The user may apply a swiping motion to the touch-sensitive display 108 to scroll through the avatar models (shown as 410a, 410b) from associated avatar files stored in the avatar database 322. More specifically, the swiping gesture may include a touch start location 400 and a touch end location 402. When the user applies the swipe gesture in accordance with the touch start and end locations 400, 402, in a direction 404, available avatars from the avatar database 322 may be displayed to the user. The user may cycle through available avatars with each swipe gesture applied to the touch-sensitive display 108. It should be noted that the swipe gesture may also be applied in a direction opposite of direction 404. A user may select an avatar by applying a single tap, double tap, tap and hold, tap and move, etc. Alternatively (or in addition to) the first avatar selection interface 320a may allow a user to browse avatar files by way of swiping gesture in other directions (e.g., up-down, diagonally, etc.) as generally understood.

FIG. 4B illustrates an exemplary embodiment of the second avatar selection interface 320b. In the illustrated embodiment, the second avatar selection interface 320b may be configured to allow a user to browse avatar files by providing thumbnails (e.g. snapshot views) of each available avatar model stored in the avatar database 322. As shown, a user may access the second avatar selection interface 320b by selecting an avatar selection application ("app") 406. Upon selection of the avatar selection app 406, a GUI 408 may be presented to the user on the display 108, in which one or more avatar models 410(1)-410(3) stored in the avatar database 322 are presented. More specifically, the snapshot views of each avatar model 410(1)-410(3) are presented. A user may select one of the avatar models to view in a larger preview mode (larger view of avatar model) by applying any known touch type, such as, for example, a single tap to the snapshot view of the avatar model. As shown, the avatar model 410(3) has been selected by the user and, upon selection, the GUI 408 may further present the selected avatar model 410(3) in a larger, preview mode frame, as indicated in 412. The user may select the avatar for use in video communication and interaction by applying any known touch type to the preview mode frame 412, including, but not limited to, a single tap, a double tap, a tap and hold, a tap and move, etc.

Figure 5:
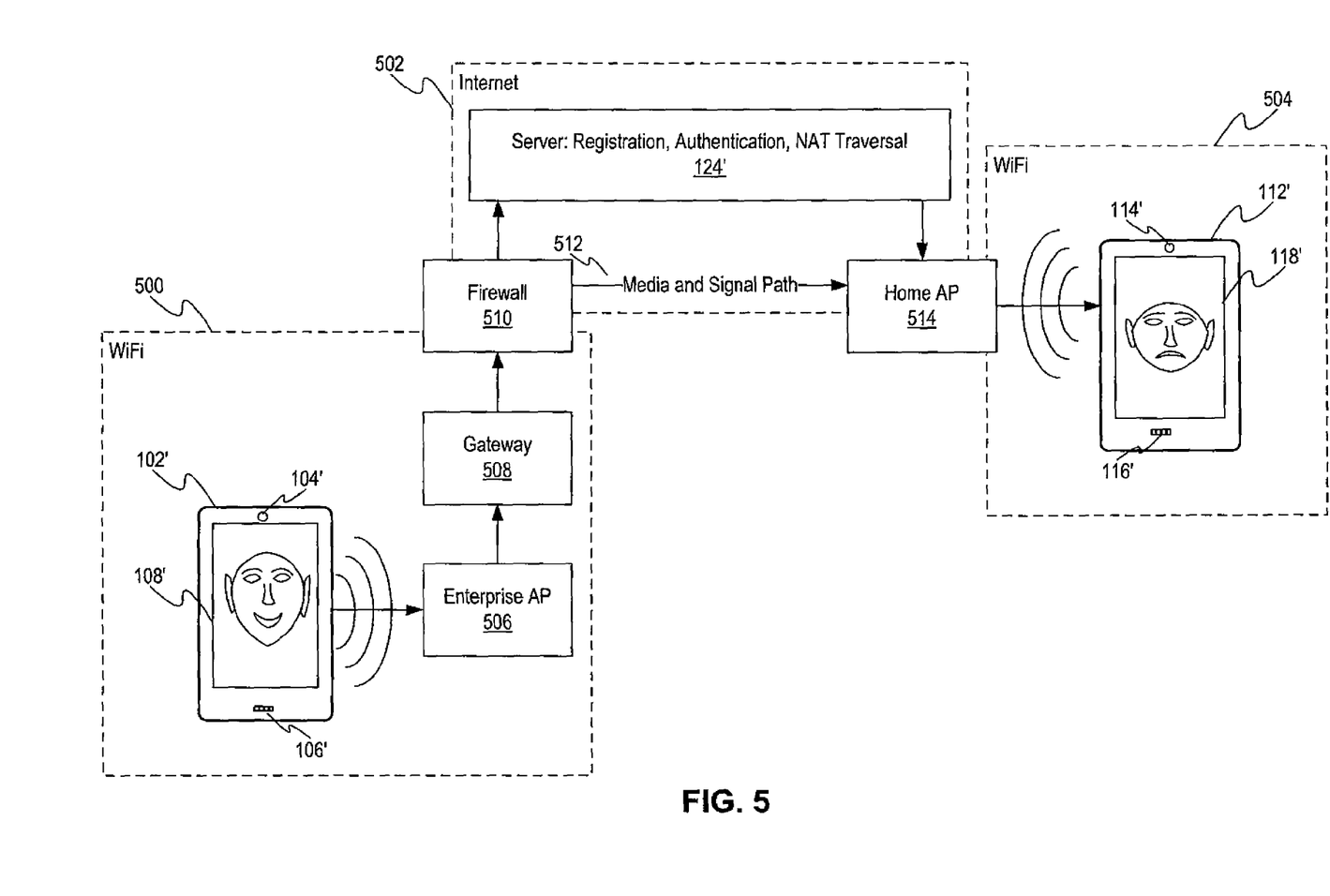
FIG. 5 illustrates an example system implementation in accordance with at least one embodiment of the present disclosure.

FIG. 5 illustrates an example system implementation in accordance with at least one embodiment. Device 102' is configured to communicate wirelessly via WiFi connection 500 (e.g., at work), server 124' is configured to negotiate a connection between devices 102' and 112' via Internet 502, and apparatus 112' is configured to communicate wirelessly via another WiFi connection 504 (e.g., at home). In one embodiment, a device-to-device avatar-based video call application is activated in apparatus 102'. Following avatar selection, the application may allow at least one remote device (e.g., device 112') to be selected. The application may then cause device 102' to initiate communication with device 112'. Communication may be initiated with device 102' transmitting a connection establishment request to device 112' via enterprise access point (AP) 506. The enterprise AP 506 may be an AP usable in a business setting, and thus, may support higher data throughput and more concurrent wireless clients than home AP 514, The enterprise AP 506 may receive the wireless signal from device 102' and may proceed to transmit the connection establishment request through various business networks via gateway 508. The connection establishment request may then pass through firewall 510, which may be configured to control information flowing into and out of the WiFi network 500.

The connection establishment request of device 102' may then be processed by server 124'. The server 124' may be configured for registration of IP addresses, authentication of destination addresses and NAT traversals so that the connection establishment request may be directed to the correct destination on Internet 502. For example, server 124' may resolve the intended destination (e.g., remote device 112') from information in the connection establishment request received from device 102', and may route the signal to through the correct NATs, ports and to the destination IP address accordingly. These operations may only have to be performed during connection establishment, depending on the network configuration.

In some instances operations may be repeated during the video call in order to provide notification to the NAT to keep the connection alive. Media and Signal Path 512 may carry the video (e.g., avatar selection and/or avatar parameters) and audio information direction to home AP 514 after the connection has been established. Device 112' may then receive the connection establishment request and may be configured to determine whether to accept the request. Determining whether to accept the request may include, for example, presenting a visual narrative to a user of device 112' inquiring as to whether to accept the connection request from device 102'. Should the user of device 112' accept the connection (e.g., accept the video call) the connection may be established. Cameras 104' and 114' may be configured to then start capturing images of the respective users of devices 102' and 112', respectively, for use in animating the avatars selected by each user. Microphones 106' and 116' may be configured to then start recording audio from each user. As information exchange commences between devices 102' and 112', displays 108' and 118' may display and animate avatars corresponding to the users of devices 102' and 112'.

Figure 6:
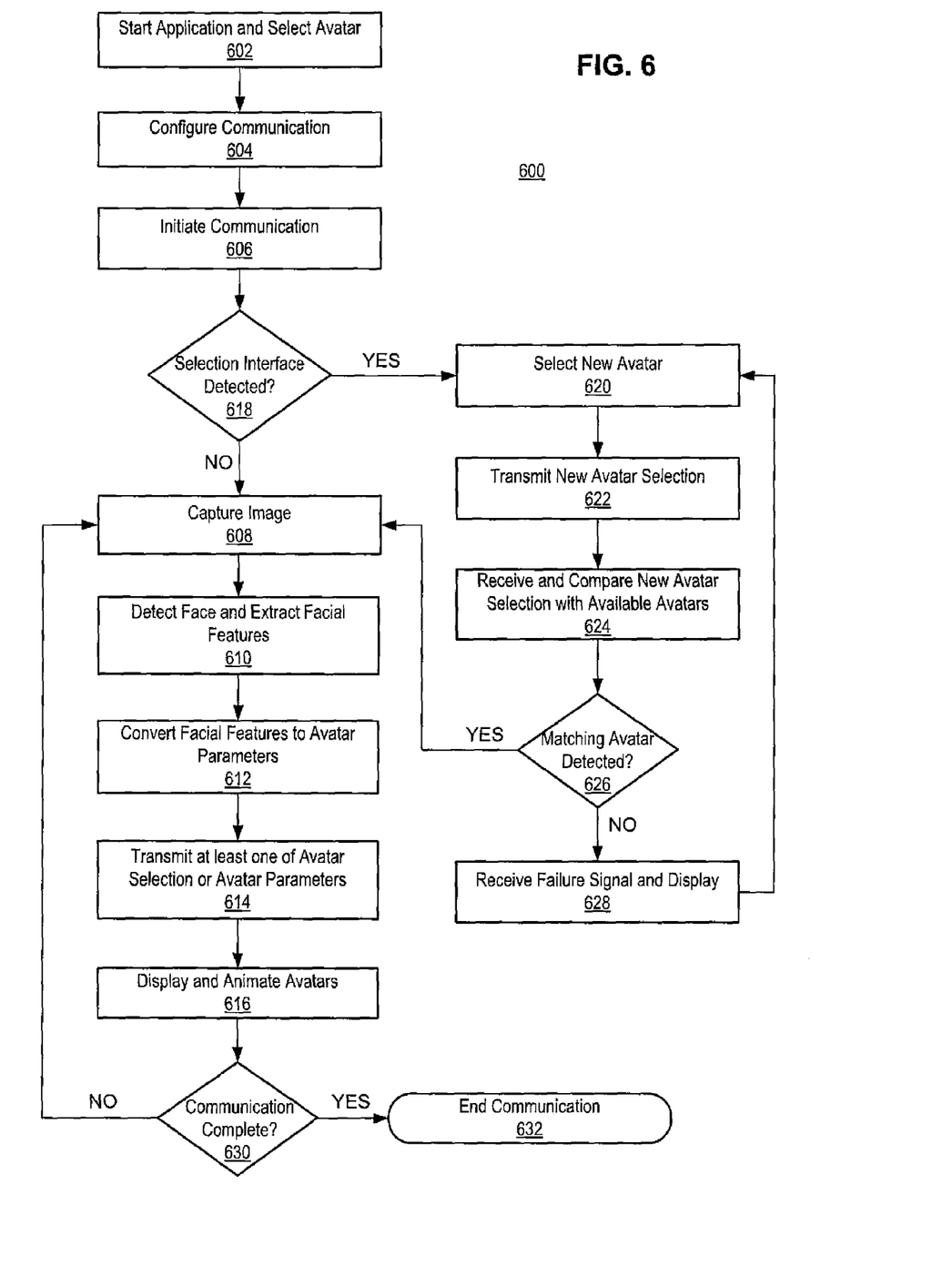
FIG. 6 is a flowchart of example operations in accordance with at least one embodiment of the present disclosure.

FIG. 6 is a flowchart of example operations in accordance with at least one embodiment. In operation 602 an application (e.g., an avatar-based voice call application) may be activated in a device. Activation of the application may be followed by selection of an avatar. Selection of an avatar may include an interface being presented by the application to the user, the interface allowing the user to browse and select from avatar files stored in an avatar database. After avatar selection, communications may be configured in operation 604. Communication configuration includes the identification of at least one remote device or a virtual space for participation in the video call. For example, a user may select from a list of remote users/devices stored within the application, stored in association with another system in the device (e.g., a contacts list in a smart phone, cell phone, etc.), stored remotely, such as on the Internet (e.g., in a social media website like Facebook, LinkedIn, Yahoo, Google+, MSN, etc.). Alternatively, the user may select to go online in a virtual space like Second Life.

In operation 606, communication may be initiated between the device and the at least one remote device or virtual space. For example, a connection establishment request may be transmitted to the remote device or virtual space. For the sake of explanation herein, it is assumed that the connection establishment request is accepted by the remote device or virtual space. A camera in the device may then begin capturing images in operation 608. The images may be still images or live video (e.g., multiple images captured in sequence). In operation 610 image analysis may occur starting with detection/tracking of a face/head in the image. The detected face may then be analyzed in order to extract facial features (e.g., facial landmarks, facial expression, etc.). In operation 612 the detected face/head position and/or facial features are converted into Avatar parameters. Avatar parameters are used to animate the selected avatar on the remote device or in the virtual space. In operation 614 at least one of the avatar selection or the avatar parameters may be transmitted.

Avatars may be displayed and animated in operation 616. In the instance of device-to-device communication (e.g., system 100), at least one of remote avatar selection or remote avatar parameters may be received from the remote device. An avatar corresponding to the remote user may then be displayed based on the received remote avatar selection, and may be animated based on the received remote avatar parameters. In the instance of virtual place interaction (e.g., system 126), information may be received allowing the device to display what the avatar corresponding to the device user is seeing.

During active communication, a user may select an avatar to use that may be different from what is currently being displayed. In other words, the user may switch avatars while still actively engaged in communication with the remote user. Whether a user decides to change avatars during active communication and access an avatar selection interface may be determined at operation 618. In operation 620, an interface may allow the user to access and browse avatars stored in an avatar database on the device during active communication with the remote device. In operation 622, the avatar selection, including corresponding identifying data, may be transmitted to the remote device, upon which the remote device may receive the avatar selection and compare the avatar selection and corresponding identifying data with identifying data of associated avatar files and stored in an avatar database of the remote device in operation 624.

A determination may then be made in operation 626 as to whether a matching avatar is detected in an avatar database of the remote device. If it is determined in operation 626 that the remote device includes an avatar file that matching the avatar selection, operations 608-616 may repeat in order to display and animate the selected avatar on the remote apparatus based on the analysis of the user's face. Otherwise, in operation 628, a failure signal is received and a failure message is presented to the user indicating that the selected avatar cannot be accessed and/or processed and operations 608-616 may repeat in order to allow the user to browse and select a different avatar to use.

A determination may then be made in operation 618 as to whether the current communication is complete. If it is determined in operation 418 that the communication is not complete, operations 608-616 may repeat in order to continue to display and animate an avatar on the remote apparatus based on the analysis of the user's face. Otherwise, in operation 620 the communication may be terminated. The video call application may also be terminated if, for example, no further video calls are to be made.

While FIG. 6 illustrates various operations according to an embodiment, it is to be understood that not all of the operations depicted in FIG. 6 are necessary for other embodiments. Indeed, it is fully contemplated herein that in other embodiments of the present disclosure, the operations depicted in FIG. 6 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. Thus, the breadth and scope of the present invention should not be limited by any of the above-described exemplary embodiments, but should be defined only in accordance with the following claims and their equivalents.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

According to one aspect, there is provided a system for avatar management and selection during active communication between a first user device and a remote user device. The system includes a first user device configured to capture user input. The first user device comprises a communication module configured to transmit information to and receive information from the remote user device. The first user device further comprises one or more storage mediums having stored thereon, individually or in combination, instructions that when executed by one or more processors result one or more operations. The operations include initiating communication between the first user device and the remote user device, identifying the user input, and identifying an avatar selection command based on the user input. The avatar selection command includes selecting an avatar file from an avatar database during active communication between the first user device and the remote user device. The operations further include transmitting identifying data corresponding to the selected avatar file to the remote user device and receiving a signal from the remote user device indicating an avatar file stored within an avatar database of the remote user device matches the avatar selection.

Another example system includes the foregoing components and the remote user device includes one or more storage mediums having stored thereon, individually or in combination, instructions that when executed by one or more processors result in the operations including receiving the avatar selection from the first user device and identifying a matching avatar file stored in the avatar database having identifying data matching the identifying data of the selected avatar file.

Another example system includes the foregoing components and identifying a matching avatar includes comparing the identifying data of the selected avatar with identifying data of at least one avatar file of the avatar database of the remote user device.

Another example system includes the foregoing components and the remote user device includes a display, wherein the instructions that when executed by one or more processors result in the following additional operation of displaying an avatar model associated with the selected avatar from the first user device.

Another example system includes the foregoing components and the first user device further includes a camera configured to capture images, wherein the instructions that when executed by one or more processors result in the following additional operations of capturing an image, detecting a face in the image, extracting features from the face; converting the features into avatar parameters, and transmitting at least one of the avatar parameters to the remote input device.

Another example system includes the foregoing components and extracting features from the face comprises determining a facial expression in the face.

Another example system includes the foregoing components and the avatar selection and avatar parameters are used to generate an avatar on the remote user device, the avatar being based on the facial features.

Another example system includes the foregoing components and the avatar selection and avatar parameters are used to generate an avatar in a virtual space, the avatar being based on the facial features.

Another example system includes the foregoing components and the instructions that when executed by one or more processors result in the following additional operation of receiving at least one of a remote avatar selection or remote avatar parameters from the remote user device during active communication between the first and the remote user devices.

Another example system includes the foregoing components and the first user device further includes a display, wherein the instructions that when executed by one or more processors result in the following additional operation of displaying an avatar based on the remote avatar selection.

Another example system includes the foregoing components and the first user device includes a touch-sensitive display and the user input is a touch event.

According to another aspect there is provided a method for avatar management and selection during active communication between a first user device and a remote user device. The method includes initiating communication from a first user device to the remote user device, the first user device being configured to capture user input. The method further includes identifying, by the first user device, the user input, and identifying, by the first user device, an avatar selection command based on the user input. The avatar selection command includes selecting an avatar file from an avatar database during active communication between the first user input device and the remote user input device. The method further includes transmitting, by the first user device, identifying data corresponding to the selected avatar file to the remote user device and receiving, by the first user device, a signal from the remote user device indicating an avatar file stored within an avatar database of the remote user device matches the avatar selection.

Another example method includes the foregoing operations and receiving, by the remote user device, the avatar selection from the first user device and identifying, by the remote user device, a matching avatar file stored in the avatar database having identifying data matching the identifying data of the selected avatar file.

Another example method includes the foregoing components and identifying a matching avatar comprises comparing said identifying data of said selected avatar file with identifying data of at least one avatar file of said avatar database of said remote user device.

Another example method includes the foregoing operations and the remote user device includes a display configured to display an avatar model associated with the selected avatar from the first user device.

Another example method includes the foregoing operations and the first user input device further includes a camera configured to capture images.

Another example method includes the foregoing operations and further includes capturing, by the camera, an image, detecting, by the first user device, a face in the image, extracting, by the first user device, features from the face, converting, by the first user device, the features into avatar parameters, and transmitting, by the first user device, at least one of the avatar parameters to the remote user device.

Another example method includes the foregoing operations and extracting features from the face includes determining a facial expression in the face.

Another example method includes the foregoing operations and the avatar selection and avatar parameters are used to generate an avatar on the remote user device, the avatar being based on the facial features.

Another example method includes the foregoing operations and the avatar selection and avatar parameters are used to generate an avatar in a virtual space, the avatar being based on the facial features.

Another example method includes the foregoing operations and further includes receiving, by the first user device, at least one of a remote avatar selection or remote avatar parameters from the remote user input device during active communication between the first and the remote user input devices.

Another example method includes the foregoing operations and the first user device includes a display configured to display an avatar based on the remote avatar selection.

Another example method includes the foregoing operations and the first user device includes a touch-sensitive display and the user input is a touch event.

According to another aspect there is provided at least one computer accessible medium including instructions stored thereon. When executed by one or more processors, the instructions may cause a computer system to perform operations for avatar management and selection during active communication between a first user device and a remote user device. The operations include initiating communication from a first user device to the remote user device, the first user device being configured to capture user input. The operations further include identifying, by the first user device, the user input, and identifying, by the first user device, an avatar selection command based on the user input. The avatar selection command includes selecting an avatar file from an avatar database during active communication between the first user input device and the remote user input device. The operations further include transmitting, by the first user device, identifying data corresponding to the selected avatar file to the remote user device and receiving, by the first user device, a signal from the remote user device indicating an avatar file stored within an avatar database of the remote user device matches the avatar selection.

Another example computer accessible medium includes the foregoing operations and receiving, by the remote user device, the avatar selection from the first user device and identifying, by the remote user device, a matching avatar file stored in the avatar database having identifying data matching the identifying data of the selected avatar file.

Another example computer accessible medium includes the foregoing components and identifying a matching avatar comprises comparing said identifying data of said selected avatar file with identifying data of at least one avatar file of said avatar database of said remote user device.

Another example computer accessible medium includes the foregoing operations and the remote user device includes a display configured to display an avatar model associated with the selected avatar from the first user device.

Another example computer accessible medium includes the foregoing operations and the first user input device further includes a camera configured to capture images.

Another example computer accessible medium includes the foregoing operations and further includes capturing, by the camera, an image, detecting, by the first user device, a face in the image, extracting, by the first user device, features from the face, converting, by the first user device, the features into avatar parameters, and transmitting, by the first user device, at least one of the avatar parameters to the remote user device.

Another example computer accessible medium includes the foregoing operations and extracting features from the face includes determining a facial expression in the face.

Another example computer accessible medium includes the foregoing operations and the avatar selection and avatar parameters are used to generate an avatar on the remote user device, the avatar being based on the facial features.

Another example computer accessible medium includes the foregoing operations and the avatar selection and avatar parameters are used to generate an avatar in a virtual space, the avatar being based on the facial features.

Another example computer accessible medium includes the foregoing operations and further includes receiving, by the first user device, at least one of a remote avatar selection or remote avatar parameters from the remote user input device during active communication between the first and the remote user input devices.

Another example computer accessible medium includes the foregoing operations and the first user device includes a display configured to display an avatar based on the remote avatar selection.

Another example computer accessible medium includes the foregoing operations and the first user device includes a touch-sensitive display and the user input is a touch event.

According to one aspect, there is provided an apparatus for avatar management and selection during active communication between a first user device and a remote user device. The apparatus includes an avatar selection module including an avatar database and one or more interfaces for allowing a user to browse avatar files stored the avatar database. The avatar selection module is configured to receive an avatar selection command based on user input. The avatar selection command includes a selected avatar file to display during active communication between the first and the remote user devices. The apparatus further includes a communication module configured to transmit identifying data corresponding to the selected avatar file to the remote user device and to further receive a signal from the remote user device indicating an avatar file stored in an avatar database of the remote user device matches the selected avatar file.

Another example apparatus includes the foregoing components and the user input is a touch event.

Another example apparatus includes the foregoing components and further includes a touch detection module configured to generate touch input data in response to one or more touch events on a touch sensitive display and to transmit the touch input data to the avatar selection module.

Another example apparatus includes the foregoing components and further includes an avatar control module configured to receive a remote avatar selection from the remote user device during active communication between the first and the remote user devices. The remote avatar selection includes at least identifying data corresponding to a selected remote avatar file on the remote user device.

Another example apparatus includes the foregoing components and the avatar control module is configured to identify a matching avatar file stored in the avatar database having identifying data matching the identifying data of the selected remote avatar file.

Another example apparatus includes the foregoing components and identifying a matching avatar file includes comparing the identifying data of the selected remote avatar file with identifying data of at least one avatar file of the avatar database.

Another example apparatus includes the foregoing components and the avatar control module is configured to generate a response signal indicating identification of the matching avatar file.

Another example apparatus includes the foregoing components and further includes a display configured to display an avatar model associated with the selected remote avatar file.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A system for avatar management and selection during active communication between a first user device and a remote user device, said system comprising:
   a first user device configured to capture user input, said first user device comprising:
      a display;
      communication circuitry configured to transmit information to and receive information from said remote user device;
      one or more storage mediums having stored thereon, individually or in combination, instructions that when executed by one or more processors result in the following operations comprising:
         initiating communication between said first user device and said remote user device;
         identifying said user input;
         identifying an avatar selection command based on said user input, said avatar selection command comprising selecting an avatar file from an avatar database during active communication between said first user device and said remote user device;
         transmitting identifying data corresponding to said selected avatar file to said remote user device;
         receiving a signal from said remote user device indicating an avatar file stored in an avatar database of said remote user device matches said selected avatar file; and
         displaying a feedback avatar based on said selected avatar.

2. The system of claim 1, wherein said remote user device comprises one or more storage mediums having stored thereon, individually or in combination, instructions that when executed by one or more processors result in the following operations comprising:
   receiving said avatar selection from said first user device; and
   identifying a matching avatar file stored in said avatar database having identifying data matching said identifying data of said selected avatar file.

3. The system of claim 2, wherein identifying a matching avatar comprises comparing said identifying data of said selected avatar file with identifying data of at least one avatar file of said avatar database of said remote user device.

4. The system of claim 2, wherein the instructions that when executed by one or more processors result in the following additional operations:
   displaying an avatar model associated with said selected avatar from said first user device.

5. The system of claim 1, wherein said first user device further comprises a camera configured to capture images, wherein the instructions that when executed by one or more processors result in the following additional operations:
   capturing an image;
   detecting a face in the image;
   extracting features from the face;
   converting said features into avatar parameters; and
   transmitting at least one of said avatar parameters to said remote input device.

6. The system of claim 5, wherein extracting features from said face comprises determining a facial expression in said face.

7. The system of claim 5, wherein said avatar selection and avatar parameters are used to generate an avatar on said remote user device, the avatar being based on the facial features.

8. The system of claim 5, wherein said avatar selection and avatar parameters are used to generate an avatar in a virtual space, said avatar being based on said facial features.

9. The system of claim 1, wherein the first user device comprises a touch-sensitive display and said user input is a touch event.

10. A method for avatar management and selection during active communication between a first user device and a remote user device, said method comprising:
- initiating communication from said first user device to said remote user device, said first user device configured to capture user input;
- identifying, by said first user device, said user input;
- identifying, by said first user device, an avatar selection command based on said user input, said avatar selection command comprising selecting an avatar file from an avatar database during active communication between said first user device and said remote user device;
- transmitting, by said first user device, identifying data corresponding to said selected avatar file to said remote user device
- receiving, by said first user device, a signal from said remote user device indicating an avatar file stored in an avatar database of said remote user device matches said avatar selection; and
- displaying a feedback avatar based on said selected avatar.

11. The method of claim 10, further comprising:
- receiving, by said remote user device, said avatar selection from said first user device; and
- identifying, by said remote user device, a matching avatar file stored in said avatar database having identifying data matching said identifying data of said selected avatar file.

12. The method of claim 11, wherein said remote user device comprises a display configured to display an avatar model associated with said selected avatar from said first user device.

13. The method of claim 12, wherein identifying a matching avatar comprises comparing said identifying data of said selected avatar file with identifying data of at least one avatar file of said avatar database of said remote user device.

14. The method of claim 10, wherein said first user input device further comprises a camera configured to capture images.

15. The method of claim 14, further comprising:
- capturing, by said camera, an image;
- detecting, by said first user device, a face in the image;
- extracting, by said first user device, features from the face;
- converting, by said first user device, said features into avatar parameters; and
- transmitting, by said first user device, at least one of said avatar parameters to said remote user device.

16. The method of claim 15, wherein extracting features from said face comprises determining a facial expression in said face.

17. The method of claim 15, wherein said avatar selection and avatar parameters are used to generate an avatar on said remote user device, the avatar being based on the facial features.

18. The method of claim 15, wherein said avatar selection and avatar parameters are used to generate an avatar in a virtual space, said avatar being based on said facial features.

19. The method of claim 10, wherein the first user device comprises a touch-sensitive display and the user input is a touch event.

20. At least one computer accessible non-transitory storage medium to store instructions which, when executed by a machine, cause the machine to perform operations comprising:
- initiating communication from a first user device to a remote user device, said first user device configured to capture user input;
- identifying, by said first user device, said user input;
- identifying, by said first user device, an avatar selection command based on said user input, said avatar selection command comprising selecting an avatar file from an avatar database during active communication between said first user device and said remote user device;
- transmitting, by said first user device, identifying data corresponding to said selected avatar file to said remote user device
- receiving, by said first user device, a signal from said remote user device indicating an avatar file stored in an avatar database of said remote user device matches said avatar selection; and
- displaying a feedback avatar based on said selected avatar.

* * * * *